US007602329B2

(12) United States Patent
Manderville et al.

(10) Patent No.: US 7,602,329 B2
(45) Date of Patent: Oct. 13, 2009

(54) SYSTEMS AND METHODS OF TRACKING AND/OR AVOIDING HARM TO CERTAIN DEVICES OR HUMANS

(75) Inventors: Scott Manderville, Georgetown, IN (US); Kevin Baxter, Glendale, CA (US); Fred Holmes, Cleveland, OK (US); Ken Fisher, Los Angeles, CA (US)

(73) Assignee: Shotspotter, Inc., Mountain View, CA (US)

( * ) Notice: Subject to any disclaimer, the term of this patent is extended or adjusted under 35 U.S.C. 154(b) by 0 days.

(21) Appl. No.: 11/982,421

(22) Filed: Oct. 31, 2007

(65) Prior Publication Data
US 2008/0165047 A1    Jul. 10, 2008

Related U.S. Application Data

(60) Division of application No. 11/930,072, filed on Oct. 30, 2007, which is a continuation-in-part of application No. 11/849,253, filed on Aug. 31, 2007, now abandoned, which is a division of application No. 11/042,414, filed on Jan. 24, 2005, now Pat. No. 7,266,045, and a continuation-in-part of application No. 10/905,788, filed on Jan. 20, 2005, and a continuation-in-part of application No. 10/248,511, filed on Jan. 24, 2003, now Pat. No. 6,847,587.

(60) Provisional application No. 60/481,934, filed on Jan. 22, 2004, provisional application No. 60/481,922, filed on Jan. 20, 2004.

(51) Int. Cl.
*G01S 13/78* (2006.01)
(52) U.S. Cl. ............... 342/45; 342/52; 342/56; 342/58; 342/67; 342/90; 342/126; 342/139; 342/146; 342/147; 342/357.17; 367/107; 367/127; 367/128

(58) Field of Classification Search ............ 342/13, 342/45, 52–59, 67, 90, 126, 139, 140, 146, 342/147, 357.06, 357.08, 357.09, 357.1, 342/357.17; 367/107, 127, 128
See application file for complete search history.

(56) References Cited

U.S. PATENT DOCUMENTS 4,091,366 A    5/1978    Lavallee (Continued)

FOREIGN PATENT DOCUMENTS

WO    WO 98/20468    5/1998

(Continued)

OTHER PUBLICATIONS

Glynn Lewis, Scott Shaw, Michael Crowe, Clay Cranford, Kevin Torvik, Dr. Peter Scharf and Bob Stelling Worth "*Urban Gunshot and Sniper Location—Technologies and Demonstration Results*," Proc. SPIE vol. 4708, pp. 315-323.

(Continued)

*Primary Examiner*—John B Sotomayor
(74) *Attorney, Agent, or Firm*—DLA Piper LLP (US)

(57) ABSTRACT

The present invention relates to systems and methods of tracking and/or avoiding harm to certain devices or humans. According to one exemplary embodiment, a method of tracking individual assets may include obtaining position data of an asset via a GPS receiver in communication with a position sensor associated with the asset, processing position data and sensor data via a processing component associated with the position sensor that receives the position data from the GPS receiver, and communicating sensor data to a host device via a communication interface associated with the position sensor and configured to enable wireless communication between the position sensor and the host device.

25 Claims, 4 Drawing Sheets

U.S. PATENT DOCUMENTS

| | | | |
|---|---|---|---|
| 4,792,806 A | 12/1988 | Bent et al. | |
| 4,855,671 A | 8/1989 | Fernandez | |
| 5,455,868 A | 10/1995 | Sergent et al. | |
| 5,504,717 A | 4/1996 | Sharkey et al. | |
| 5,586,086 A | 12/1996 | Permuy et al. | |
| 5,703,835 A | 12/1997 | Sharkey et al. | |
| 5,973,998 A | 10/1999 | Showen et al. | |
| 5,991,460 A * | 11/1999 | Mitchell | 382/278 |
| 6,028,514 A | 2/2000 | Lemelson et al. | |
| H1916 H | 11/2000 | Hollander | |
| 6,166,679 A * | 12/2000 | Lemelson et al. | 342/45 |
| 6,178,141 B1 | 1/2001 | Duckworth et al. | |
| 6,392,692 B1 | 5/2002 | Monroe | |
| 6,437,727 B2 * | 8/2002 | Lemelson et al. | 342/45 |
| 6,545,601 B1 | 4/2003 | Monroe | |
| 6,600,417 B2 | 7/2003 | Lerg et al. | |
| 6,847,587 B2 | 1/2005 | Patterson et al. | |
| 7,139,222 B1 | 11/2006 | Baxter et al. | |
| 7,266,045 B2 * | 9/2007 | Baxter et al. | 367/128 |
| 2001/0006372 A1 * | 7/2001 | Lemelson et al. | 342/45 |
| 2002/0003470 A1 | 1/2002 | Auerbach | |
| 2003/0061344 A1 | 3/2003 | Monroe | |
| 2004/0100868 A1 | 5/2004 | Patterson et al. | |
| 2005/0237186 A1 | 10/2005 | Fisher et al. | |
| 2006/0095199 A1 | 5/2006 | Lagassey | |
| 2006/0114749 A1 | 6/2006 | Baxter et al. | |
| 2006/0161339 A1 | 7/2006 | Holmes et al. | |
| 2006/0249010 A1 | 11/2006 | John et al. | |
| 2006/0280033 A1 | 12/2006 | Baxter et al. | |
| 2008/0165047 A1 * | 7/2008 | Fisher et al. | 342/45 |
| 2008/0192574 A1 * | 8/2008 | Baxter et al. | 367/107 |
| 2008/0221793 A1 * | 9/2008 | Fisher et al. | 701/213 |
| 2008/0266084 A1 * | 10/2008 | Fisher et al. | 340/540 |
| 2008/0267012 A1 * | 10/2008 | Fisher et al. | 367/127 |
| 2008/0267013 A1 * | 10/2008 | Fisher et al. | 367/127 |
| 2008/0298176 A1 * | 12/2008 | Fisher et al. | 367/127 |
| 2009/0074422 A1 * | 3/2009 | Stewart | 398/118 |

FOREIGN PATENT DOCUMENTS

| | | |
|---|---|---|
| WO | WO 00/73811 | 12/2000 |

OTHER PUBLICATIONS

Lorraine Green Mazerolle, "Using Gunshot Detection Technology in High-Crime Areas," National Institute of Justice, U.S. Department of Justice (Washington, D.C.), (Jun. 1998).

* cited by examiner

SYSTEMS AND METHODS OF TRACKING AND/OR AVOIDING HARM TO CERTAIN DEVICES OR HUMANS

CROSS REFERENCE TO RELATED APPLICATIONS

This is a division of application Ser. No. 11/930,072, filed Oct. 30, 2007, which is a continuation-in-part: (1) of application Ser. No. 11/849,253, filed Aug. 31, 2007 now abandoned, which is a division of application Ser. No. 11/042,414, filed Jan. 24, 2005, now U.S. Pat. No. 7,266,045, which claims benefit/priority from provisional application No. 60/481,934; and (2) of application Ser. No. 10/905,788, filed Jan. 20, 2005, published as US2005/0237186, which claims benefit/priority of provisional application No. 60/481,922, filed Jan. 20, 2004, and is a continuation-in-part of application Ser. No. 10/248,511, filed Jan. 24, 2003, now U.S. Pat. No. 6,847,587, all of which are incorporated herein by reference in entirety.

BACKGROUND

1. Field

The present invention relates to a system and method of tracking and/or avoiding harm to certain devices or humans. More particularly, but not by way of limitation, the present invention provides a highly accurate system for tracking the movement of troops, vehicles and other military assets (which may be collectively referred to as "military assets" or "blue forces"), and/or avoiding harm thereto.

2. Description of Related Information

While most weapons systems have embraced the latest technology to give our soldiers every possible edge, the light infantry soldier still relies primarily on his rifle and body armor to practice his trade. It is well established that better utilization of technology can help a soldier perform at a higher level as well as help keep the soldier alive.

One such system for improving information available to a soldier is a gunshot location system such as the one described in U.S. Pat. No. 7,139,222 issued to Baxter et al. One exemplary aspect of this system provides a plurality of man-wearable acoustic sensors which may detect gunshots and send pertinent information to a host computer via a wireless network. The host may use the differences in times-of-arrival from three or more sensors to provide a source location of gunfire.

As is well recognized in the art, the load carried by a light infantry soldier must be kept below a level where it impacts his ability to perform. Further, it would be useful, at all levels of command, to have precise troop positions available, whether for troops under that particular command or not. Such monitoring is sometimes referred to as "blue force tracking." Having detailed troop positions available could significantly reduce the response time when soldiers find themselves in trouble and reduce the risk of having soldiers in the wrong place, i.e. caught in crossfire, caught under friendly fire, etc.

Finally, it could prove useful for any level of command to be able to communicate directly with any individual soldier. While many soldiers now carry cell phones or pagers, there is no system in place to selectively deliver a message to any particular soldier, except through time consuming processes.

A technological problem facing deployment of a soldier worn system, such as a gunshot detection system, is network management when there may be tens of thousands of nodes on the network, and the vast majority of such nodes are regularly in motion. As one can readily appreciate, in a battlefield situation, every sensor reporting every gunshot could produce a crippling amount of data.

Thus an advantage consistent with aspects related to the present innovations is the provision of systems and methods of blue force tracking.

Another advantage consistent with aspects related to the present innovations is the provision of blue force tracking through a multi-purpose sensor, such as employed in a gunshot location system, so that there is no duplication of on-soldier infrastructure such as GPS receivers, communication interfaces, and the like.

A further advantage consistent with aspects related to the present innovations is the provision of systems and methods of alerting a soldier that he is firing on friendly troops.

Still a further advantage consistent with aspects related to the present innovations is the provision of a layered network approach for communication among devices on a network such that communications at a squad level do not adversely effect the network bandwidth of a nearby squad and such that a any network device can communicate with any host and any level of command.

SUMMARY

The present invention relates to systems and methods of tracking and/or avoiding harm to certain devices or humans. According to one exemplary embodiment, a method of tracking individual military assets may include obtaining position data of a military asset via a GPS receiver associated with a position sensor on a military asset, processing position data and sensor data via a processing component associated with the position sensor that receives the position data from the GPS receiver, and communicating sensor data to a host device via a communication interface associated with the position sensor and configured to enable wireless communication between the position sensor and the host device.

Further features and advantages of the present innovations will be apparent to those skilled in the art upon examining the accompanying drawings and upon reading the following description of some exemplary embodiments.

DESCRIPTION OF EXEMPLARY EMBODIMENTS

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

For purposes of this disclosure, the term "man wearable" refers to a sensor which is integrated into a piece of equipment normally carried by a soldier, integrated into an article of clothing, or attached to a piece of equipment or article of clothing via a secure mount such as a latch, hook-and-loop strap, etc. According to one or more exemplary aspects, each man wearable sensor may include a GPS receiver for receiving positional information and for receiving synchronized time; a processor; and a communications interface for communicating wirelessly with the host processor.

In some exemplary aspects, systems that require similar information, i.e. positional information regarding gunshot detection, navigation, etc., may share components and/or information, rather than having redundant hardware that would only weigh the soldier down.

According to other exemplary aspects, additional sensors may be attached to vehicles such that the position of such vehicles may be tracked.

According to still other exemplary aspects, the networked elements may communicate in a layered approach wherein the sensors at a squad level communicate to a local host within the squad. Each squad host then communicates upward to a host at the next higher level. Gunshot information from neighboring squads may be provided upward to a common host and then downward to the squad host to utilize additional sensors in locating a gunshot.

According to other illustrative aspects, an exemplary system may include a command center and a host processor at, or in communication with, the command center to track the positions of all military assets under the command of the command center.

Figure 1:
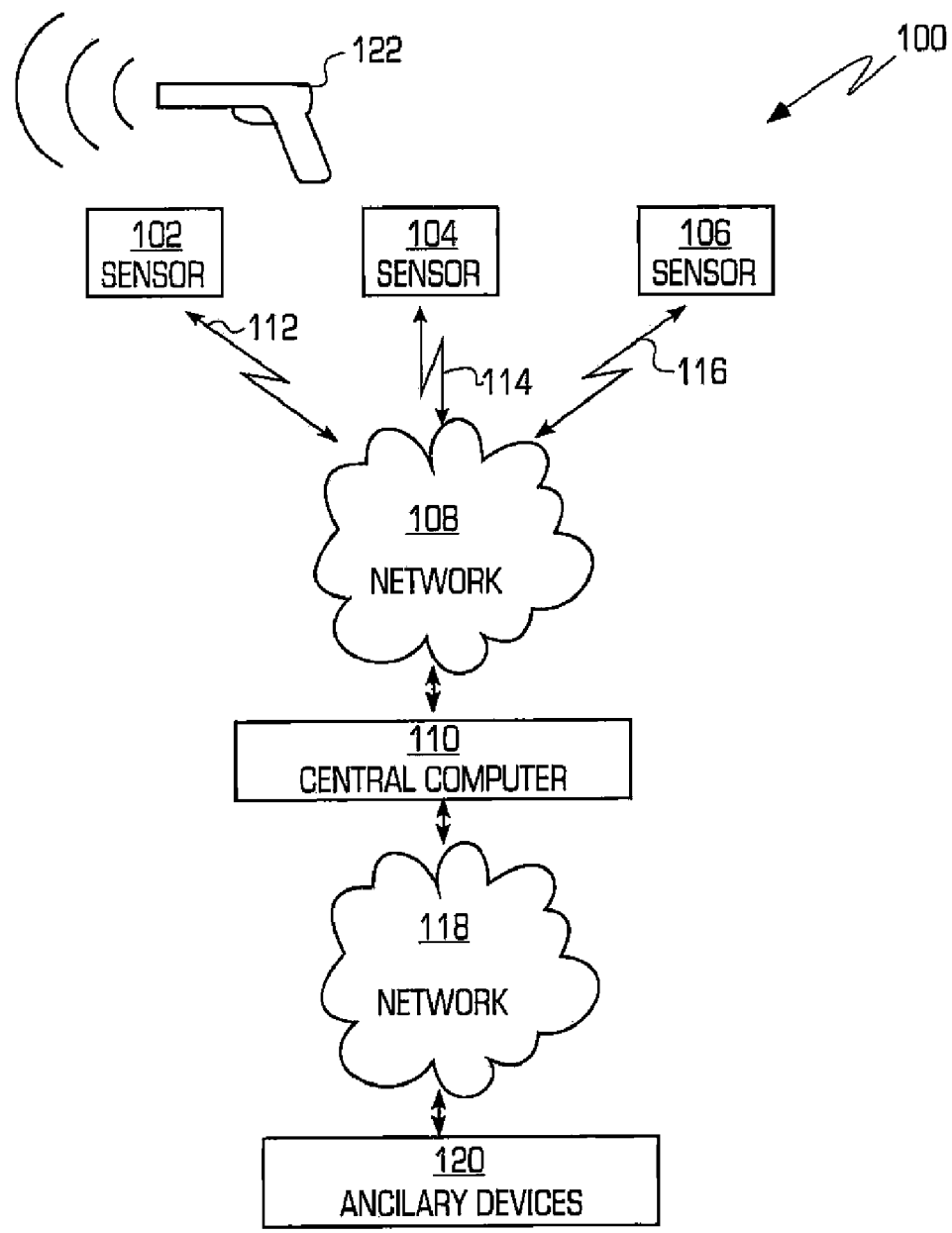
FIG. 1 illustrates one exemplary configuration of the inventive blue force tracking system within a gunshot detection system, consistent with aspects related to the innovations herein.

Referring now to the drawings, wherein like reference numerals indicate the same parts throughout the several views, a representative gunshot detection system 100 is shown in its general environment in FIG. 1. In one exemplary embodiment, a plurality of sensors 102-106 are dispersed over a monitored area. Sensors 102-106 may be any combination of fixed sensors and/or portable sensors. According to some aspects, fixed sensors are placed to have a relatively unobstructed acoustic view around the immediate area. By way of example and not limitation, suitable sites for fixed sensors include: placed atop a building; placed atop utility or light poles; on towers, etc. Typically sensors 102-106 communicate through a communication network 108 with a centralized processor 110 wherein information concerning acoustic events is processed to provide details of the event, such as the source location of a gunshot, time of the gunshot, the number of detected gunshots, the type of event, and the like. It should be noted that sensors 102-106 may be any combination of wired or wireless sensors, that communications paths 112-116 may carry either analog or digital signals, and that network 108 may comprise any combination of sub-networks, such as, by way of example and not limitation: a telephone network; the internet; a private computer network; a wireless network, or even a collection of dedicated wires routed to the sensor array.

It one or more exemplary implementations, at least some sensors of sensors 102-106 are man-wearable. In such a system, the host computer 110 and a display devices 120 would likely be carried by a squad leader. Other ancillary display devices may be provided with each man-wearable sensors to allow the soldier to return fire, or at least take cover. In such as a system, other ancillary systems may use data collected by the system and reported in real time, or near real time, to higher levels or command centers.

Figure 2:
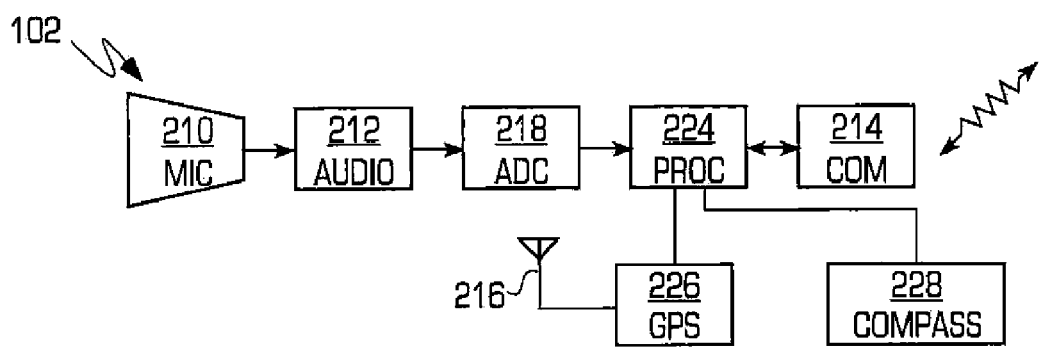
FIG. 2 is a block diagram of a wireless sensor for use in an exemplary blue force tracking system consistent with aspects related to the innovations herein.

Referring to FIG. 2, one exemplary implementation of sensor 102 includes: a microphone for receiving acoustic events; an amplifier 212 and possibly other signal conditioning circuitry; a processor 224, typically a digital signal processor, having, integral or associated therewith, an analog to digital converter 218. Processor 224 may include or be associated with other components or subcomponents related to the performance of data processing within the sensor 224. Such components and subcomponents may include, but are not limited to, hardware, software and/or firmware elements, or any combination of these elements. Further, these processing components and subcomponents may execute their functionality in any discrete and/or distributed manner that enables performance of the processing steps set forth herein. Sensor 102 may also include a GPS receiver 226 and its associated antenna 216; an electronic compass 228; and an interface 214 for communicating via a communication network.

In practice, gunshots are received at microphone 210, the audio signal is conditioned by circuitry 212, digitized by A/D converter 218 and processed to detect gunshots in DSP 224. Upon detecting a gunshot, a time of arrival and sensor position are obtained from GPS receiver 226 and transmitted to a host system via interface 214.

As will be appreciated by those skilled in the art, in a law enforcement environment information about a detected acoustic event is typically output to a person of interest such as a police dispatcher or directly to individual officers, as through network 118 to display devices 120 or a computer console. When weapon 122 is fired, the muzzle blast reaches sensors 102-106 at different times based on the speed of sound and the distance between a sensor and the shooter. Whether the acoustic information is processed at the sensor, or at computer 110, a time of arrival is determined for each sensor and the differences of the various times of arrival are processed to determine a location of the source of the gunshot. In response to the gunshot, information is provided at device 120. As will also be appreciated by those skilled in the art, the systems described hereinbelow and methods employed for blue force tracking are equally applicable to law enforcement applications.

As such, systems and methods of tracking assets, such as military assets, consistent with aspects related to the innovations herein may be implemented. For example, a method of tracking individual military assets may include obtaining position data of a military asset via a GPS receiver associated with (e.g., contained within, in communication with, etc.) a position sensor associated with the military asset, processing the position data and sensor data via a processing component associated with the sensor that receives the position data from the GPS receiver, communicating sensor data to a host device via a communication interface in the sensor configured to enable wireless communication between the sensor and the host device, and communicating information based on the sensor data from the host device to any of the various, appropriate entities disclosed throughout, including to higher levels of command.

Another exemplary method of tracking individual military assets may include obtaining position data of a military asset via a GPS receiver associated with a position sensor associated with the military asset, processing position data and sensor data via a processing component associated with the sensor that receives the position data from the GPS receiver, communicating sensor data to a host device via a communication interface in the sensor configured to enable wireless communication between the sensor and the host device, obtaining gunshot location data from a gunshot location sensor associated with a position sensor, obtaining direction data from an electronic compass in communication with the processing component, and receiving, at the communication interface, communications beneficial at the sensor and/or to the user. For example, communications from higher levels of command providing information about weapon fire incidents may be received.

Figure 3:
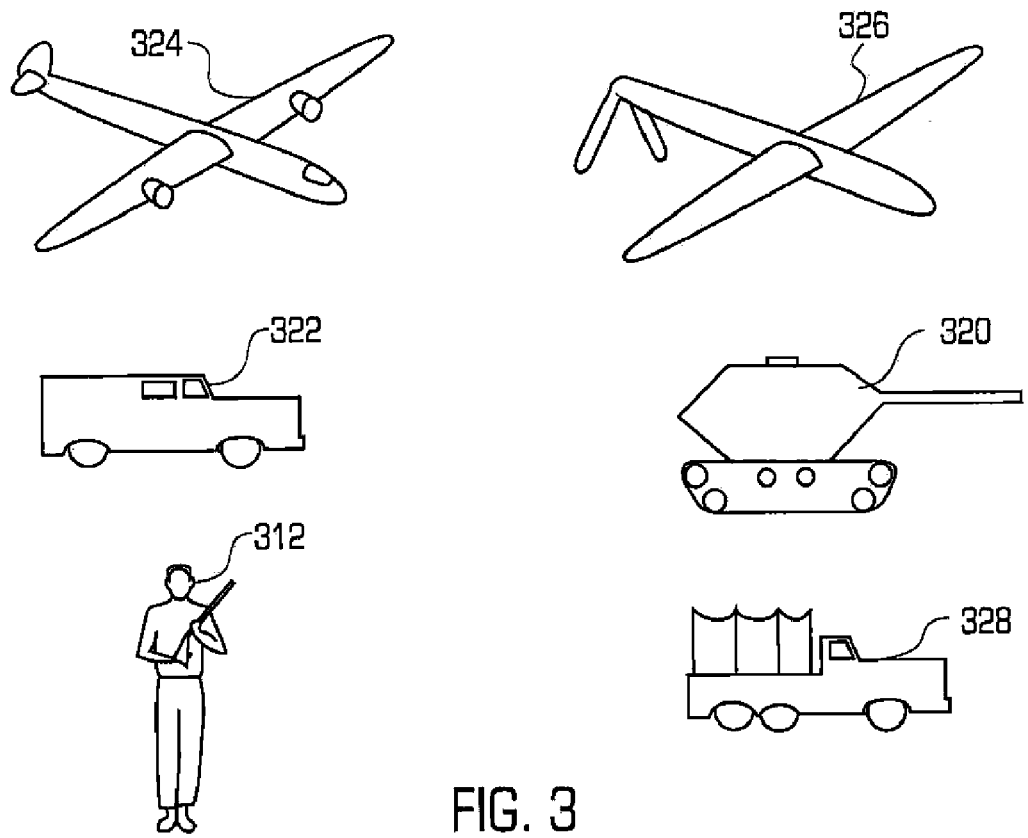
FIG. 3 illustrates several groups of assets, each member of each group equipped with an exemplary implementation of a sensor consistent with aspects related to the innovations herein.

Turning next to FIGS. 3 squad 310 is configured such that each squad member 312 is equipped with a sensor 102. In addition, other military assets are also equipped with a portable gunshot detection sensor 102 such as: tank 320; armored personnel transport 322; fighter aircraft 324; UAV 326; and vehicle 328. When any sensor 102 receives a gunshot, or identifiable acoustic event, a location and a time-of arrival are sent to the asset's designated host. It should be noted that the network is generally configured such that assets with large amounts of electricity, i.e. a vehicle or aircraft, can bridge network traffic for other assets which may be strictly battery powered, i.e. a soldier, to achieve communication over any distance required while using battery power at the lowest level possible.

Figure 4:
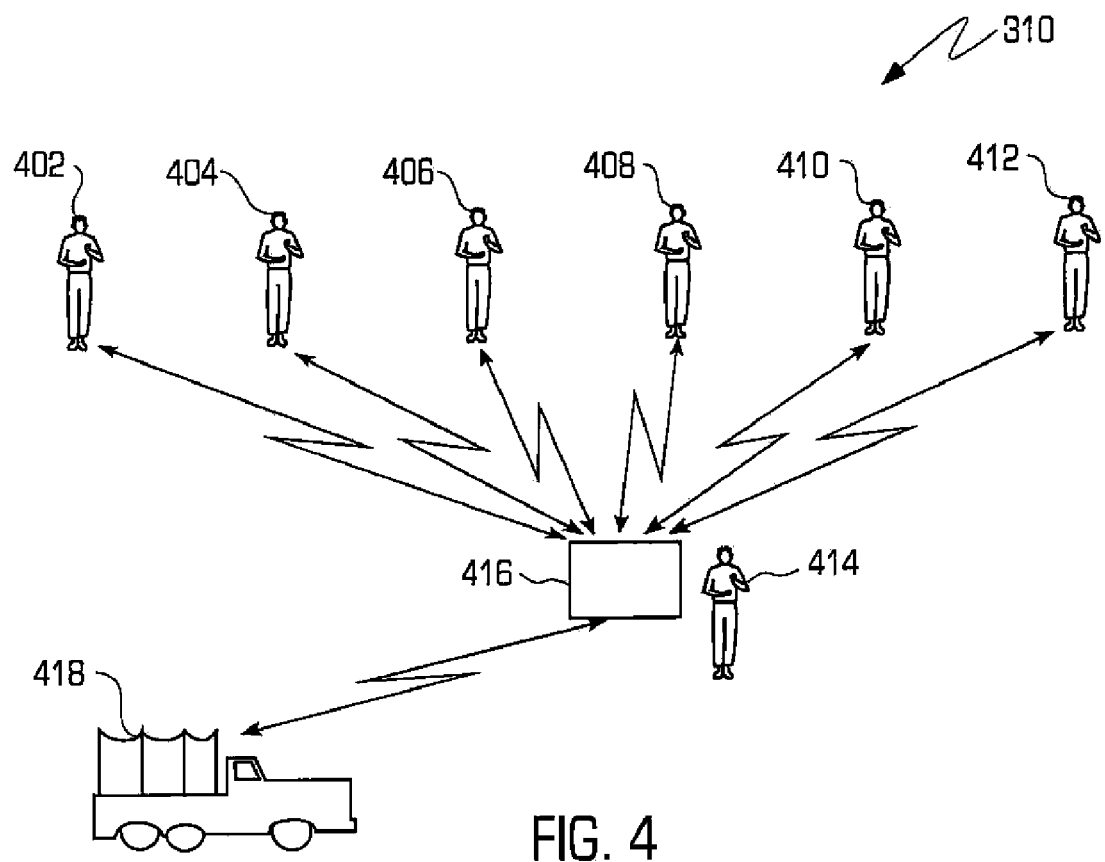
FIG. 4 illustrates a squad with each squad member equipped with an exemplary implementation of a sensor and a host located with the squad leader consistent with aspects related to the innovations herein.

With reference to FIG. 4, squad 310 includes a plurality of soldiers 402-412, a squad leader 414 carrying a host device 416, and a military vehicle 418, each equipped with a sensor 102. When an acoustic event is received at the squad, each sensor 102 communicates with host 416 which calculates a source location for the event. In addition, the network interface of host 416 relays a message through the network interface located in vehicle 418 to notify the next level of command as to the event and its source location. In addition, each sensor 102 periodically sends its location to host 416 which, in turn, forwards the information upward to the next layer in the network. Each network layer collects all locations from its child sub-networks and forwards both event information and asset positional information to the next higher level. In this manner, a command center can receive tracking information for every asset under its command.

As will be apparent to those skilled in the art, the precise protocol employed in the network is unimportant. However, the network may employ TCP/IP and/or UDP, or some variations thereof. Each squad or independent group of assets would be assigned a subnet within a hierarchical address scheme such that higher level hosts could maintain direct access to individual assets simply by manipulation of their subnet mask. Such schemes are well known in the art and it is not necessary to address such schemes here. Thus, the router function of sensor 102 of vehicle 418 will not forward messages within squad 310 unless the address of the receiving party indicates that forwarding is necessary. Thus local communications do not effect other squads or the system as a whole.

Figure 5:
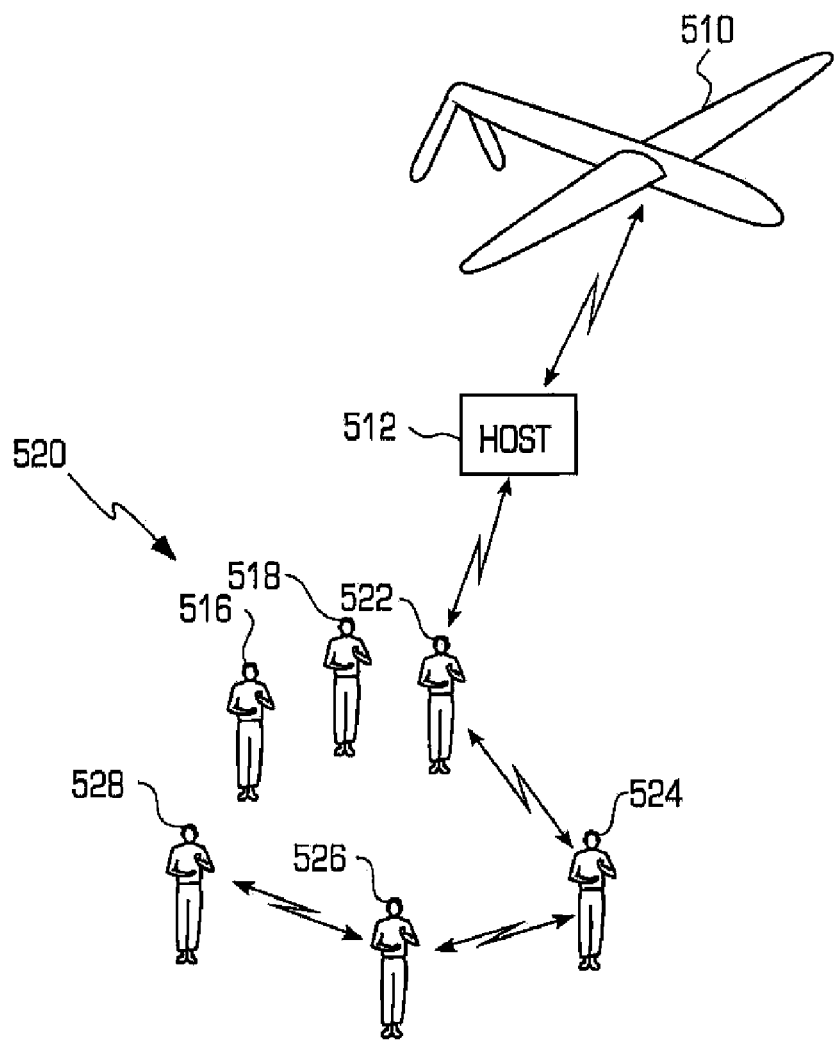
FIG. 5 illustrates communication from an out-of-squad asset upward to a common host and then downward to a squad under fire consistent with aspects related to the innovations herein.

Generally speaking, difference-time-of-arrival triangulation is most accurate when the distance between some of the sensors is greater than the distance from the event to the nearest sensor. Accordingly, there may be times when an out-of-squad sensor may receive an acoustic event and it is advantageous to include the out-of-squad sensor in the solution. Turning to FIG. 5, if an overhead UAV 510 receives an acoustic event, the event is forwarded to its ground-based host 512. If host 512 has been notified that a squad 520 is operating in the vicinity of UAV 510, received events may be forwarded upward through hosts 522 and 524 to common host 526, and then back down to squad leader 528. In this way, UAV 510 may be an "outrigger" sensor to improve the quality of the computed source locations. In addition it should be noted that UAV 510 provides a handy bridge from the network interface of a squad leader back to a wide-area network since UAV 510 likely needs digital communication with a base.

As can be seen from the preceding discussion, the inventive network may be modeled as a series of layers. Those familiar with network topology may be accustomed to thinking of networks in terms of layers, i.e. physical layer, data link layer, transport layer, etc, and the immediate approach is neither inconsistent with such a network philosophy nor is it limited to networks defined as such. In a network having a physical layer, the layers of the inventive network are simply sub-layers residing within the physical layer. In a broader sense however, the layers of the present invention are operational from a military perspective in that the layers are divided through conventional military wisdom, along chains of command and, at the highest layers, along branches of service. As will be apparent to those skilled in the art, the approach provides enough freedom that the bulk of communications are limited to a small group at a particular layer. However, the system is robust enough that any node may become a bridge for network traffic, regardless of whether the bridge device is involved in the particular communication, or not.

Figure 6:
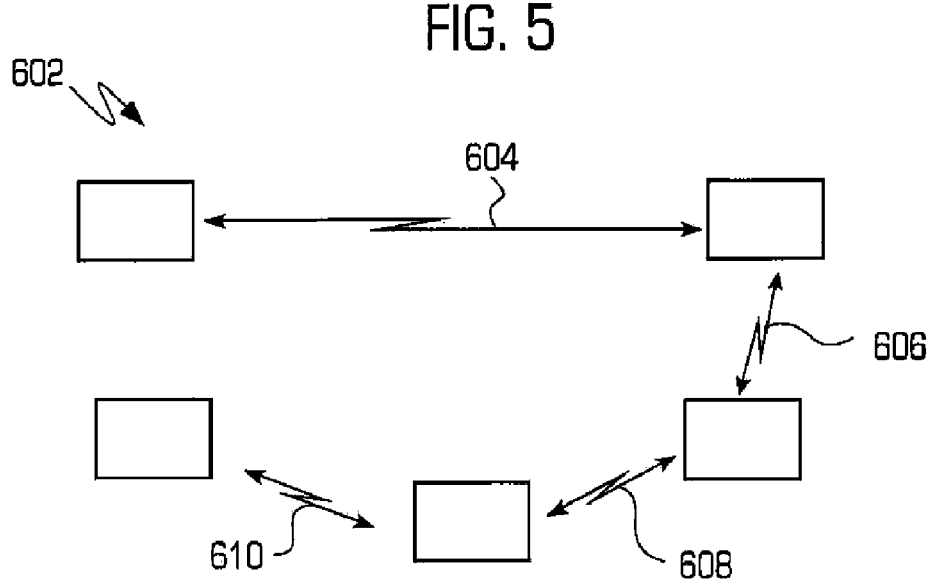
FIG. 6 illustrates a network having an arbitrary number of layers and the communication paths between layers consistent with aspects related to the innovations herein.

Turning next to FIG. 6, a network 602 having an arbitrary number of layers, both in the longest path 604, or in total path 604-610. It should be noted that if routing devices which facilitate communication between layers are configured to provide network address translation ("NAT"), IP addresses may be simultaneously reused along different paths 604-610. NAT is well known in the art of computer networks and allows a router to substitute its address for the source address and substitute a unique port number to a particular communication. Return messages are then sorted and properly distributed by the router using the port address affixed to an incoming message.

Figure 7:
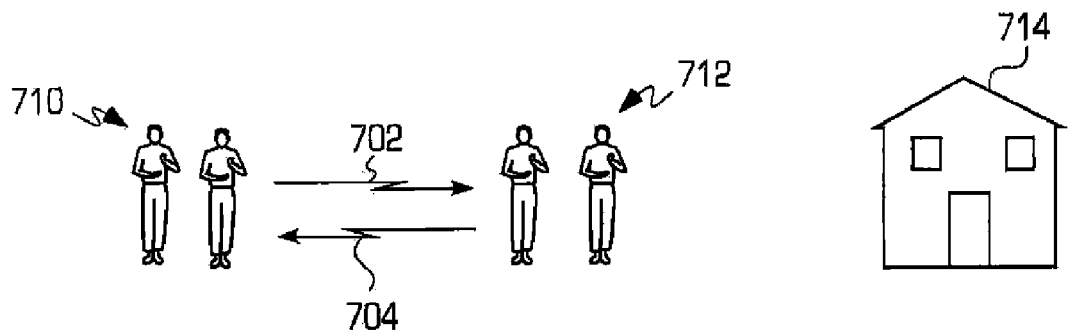
FIG. 7 illustrates groups of soldiers in situations related to potential friendly fire incidents consistent with aspects related to the innovations herein.

Referring next to FIG. 7, one advantage of the inventive system is the ability to assess an ever larger picture of the battlefield as one moves up the chain of command. Thus, at each level of command, the host processor may be programmed to look for anomalous events. As depicted in FIG. 7, if a command center detects gunfire 704 originating from group 712 and directed at group 710, a warning can be immediately sent to the individual sensors worn by group 712 to cease fire, stopping a friendly fire situation in the first few rounds fired. Indeed, a variety of distinctive embodiments relate to exemplary features and functionality related to friendly fire incidents and/or aspects of avoiding harm to assets, such as military assets or blue forces. As shown in FIG. 7, for example, if enemy fire originates from building 714 and group 710 has to shoot in a direction 702 through group 712 to return fire, group 710 can be ordered to hold its fire while group 712 can be instructed to return fire on the enemy, thus avoiding crossfire through group 712. Further, the determination of incidents when users of individual sensors are firing weapons at each other may be made by a remote processor, such as a host component, it may be made by processors within one or more sensors, or it may be made by any group of such elements. Once the determination is made, a friendly fire incident warning is transmitted to sensors associated with the incident.

With regarding to some exemplary friendly fire embodiments, various advantageous processes of detecting friendly fire may be used. For example, a method of detecting friendly fire may include obtaining position data of a military asset via a GPS receiver in communication with or contained within a position sensor associated with the military asset, and processing position data and sensor data via a processing component that receives the position data from the GPS receiver. This processing component may be contained within the sensor, or it may be distributed across various other elements and/or components associated with the process. Next, sensor data may be communicated to a host device via a communication interface in or associated with the sensor and configured to enable wireless communication between the sensor and the host device. At any point throughout this process, direction data may also be obtained from an electronic compass in communication with the processing component. Information may then be exchanged with the host device to enable the host device to determine when users of individual sensors are firing weapons at each other, and a friendly fire incident warning may be received when the sensor is associated with an identified friendly fire incident. It should be noted that steps within this process are not limited to any stated order, but instead may occur in any order consistent with their logical substance.

Systems and methods of determining whether to employ lethal measure within a certain boundary to avoid harm to assets, wherein the assets include certain devices and/or humans, also form part of these distinctive embodiments. An exemplary method here, for example, may include associating a sensor with each asset, wherein said sensor having a GPS receiver, and determining by the GPS receiver a location of the asset. Further, such exemplary methods may include transmitting wirelessly the location of the asset so determined to a host device, and determining whether to employ the lethal measure in response to the location of the asset transmitted to the host device.

Figure 8:
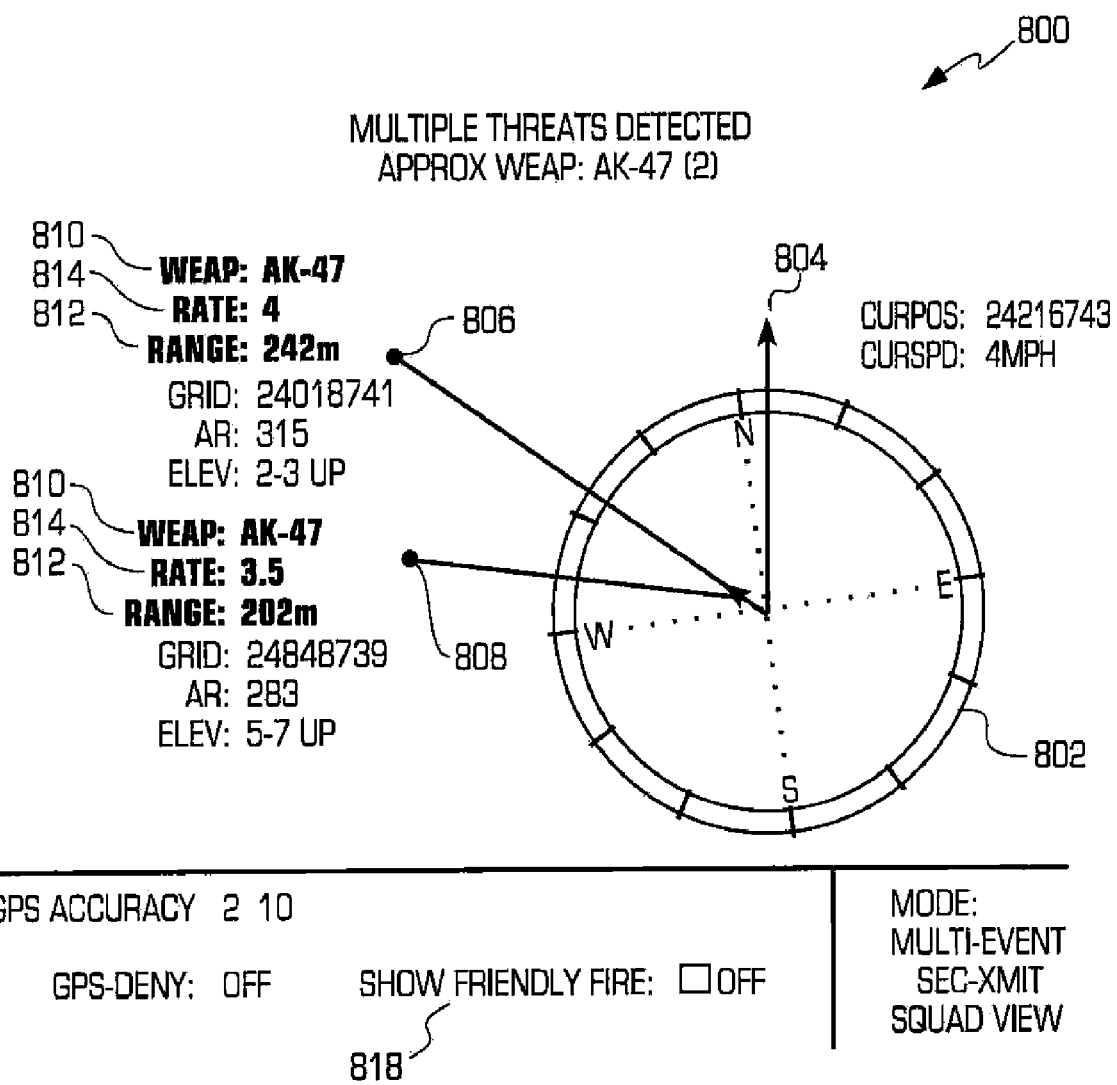
FIG. 8 illustrates an exemplary embodiment of a display associated with a man wearable sensor consistent with aspects related to the innovations herein.

FIG. 8 depicts a watch-like display 810 which could be used by an individual soldier both for display of targeting information and to warn of potential friendly fire situations. In one exemplary embodiment, watch 810 includes an aggressive vibrator to get the soldier's attention if conditions warrant.

It should be noted that when a sensor, or host, is used with an external or associated display 810, that a communication means is required between the sensor and the display. By way of example and not limitation suitable communication means include: a digital radio link; infrared; wireless Ethernet; Bluetooth; and the like.

It should also be noted that while exemplary embodiments of the present invention have been described in connection with gunshot location systems, the techniques for blue force tracking and the layered network are suitable for any system that places a GPS and a network interface on individual military assets.

As disclosed herein, embodiments and features of the invention may be implemented through computer-hardware, software and/or firmware. For example, the systems and methods disclosed herein may be embodied in various forms including, for example, a data processor, such as a computer that also includes a database, digital electronic circuitry, firmware, software, related subcomponents, and/or in combinations of them. Further, while some of the disclosed implementations describe processing components such as hardware elements or software, systems and methods consistent with the present invention may be implemented with any combination of hardware, software and/or firmware. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may also be implemented as a computer program product, i.e., a computer program tangibly embodied in an information carrier, e.g., in a machine readable storage medium or element or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subcomponent, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the invention, which is defined by the scope of the appended claims. Other embodiments are within the scope of the following claims.

We claim:

1. A method of detecting friendly fire comprising:
   obtaining position data of a military asset via a GPS receiver contained within a position sensor associated with the military asset;
   processing position data and sensor data via a processing component contained in the sensor that receives the position data from the GPS receiver;
   communicating sensor data to a host device via a communication interface in the sensor configured to enable wireless communication between the sensor and the host device;
   obtaining direction data from an electronic compass in communication with the processing component;
   determining a source location for weapon fire based on acoustic energy emitted by the weapon upon firing;
   processing information within the host device, including the source location, to enable the host device to determine when users of individual sensors are firing weapons at each other; and
   receiving a friendly fire incident warning when the sensor is associated with the friendly fire incident.

2. The method of claim 1 further comprising:
   determining an incident when users of individual sensors are firing weapons at each other; and transmitting a friendly fire incident warning to sensors associated with the incident.

3. The method of claim 1 further comprising providing a mounting component associated with the electronic compass, such that the electronic compass provides direction data enabling a processor to determine a direction the user's weapon is pointed.

4. The method of claim 1 further comprising configuring the communication interface to communicate via a layered network.

5. A system that detects friendly fire comprising:
a plurality of position sensors for attachment to military assets, each sensor comprising:
a GPS receiver for determining the position of a military asset;
a processing component that receives position data from the GPS receiver, the processing component including a subcomponent configured for communicating sensor data; and
an electronic compass in communication with the processing component; and
a communication interface configured to enable wireless communication between the sensor and a host;
wherein the communication interface is further configured to:
allow exchange of information with a host device to enable the host device to determine when users of individual sensors are firing weapons at each other; and
receive a friendly fire incident warning when the sensor is associated with the friendly fire incident; and
an acoustic information processing component that determines a location of a source of a weapon fire incident, upon firing of the weapon, for processing by the host device.

6. The system of claim 5 further comprising a host device including a subcomponent that determines when users of individual sensors are firing weapons at each other and transmits a friendly fire incident warning to sensors associated with the friendly fire incident.

7. The system of claim 5 wherein the electronic compass includes a mounting element that mates with the user, a piece of the user's equipment, or a weapon, and provides direction data enabling a processor to determine a direction the user's weapon is pointed.

8. The system of claim 5 wherein the communication interface is configured to communicate via a layered network.

9. A method of determining whether to employ lethal measure within a certain boundary to avoid harm to assets, wherein the assets include certain devices and/or humans, the method comprising:
associating a sensor with each asset, wherein said sensor includes a GPS receiver;
determining by the GPS receiver a location of the asset;
transmitting wirelessly the location of the asset so determined to a host device;
determining a source location for weapon fire based on acoustic energy emitted by the weapon upon firing; and
determining whether to employ the lethal measure in response to the location of the asset transmitted to the host device and the source location.

10. The method of claim 9 further comprising:
determining an incident when users of individual sensors are firing weapons at each other; and
transmitting a friendly fire incident warning to sensors associated with the incident.

11. The method of claim 9 further comprising obtaining, via an electronic compass included with the sensor, directional information associated with the asset or a user of the asset.

12. The method of claim 11 further comprising providing a mounting component associated with the electronic compass, such that the electronic compass provides direction data enabling a processor to determine a direction the user's weapon is pointed.

13. The method of claim 9 further providing, in association with each asset, a communication interface configured to communicate via a layered network.

14. The method of claim 13 further comprising configuring each communication interface to transmit and receive communications among the plurality of position sensors.

15. The method of claim 9 further comprising associating a gunshot location sensor with each sensor of a subset of the plurality of position sensors.

16. The method of claim 9 further comprising associating an electronic compass with each position sensor.

17. The method of claim 9 including associating a position sensor with a UAV.

18. The method of claim 10 further providing, in association with each asset, a communication interface configured to communicate via a layered network.

19. The method of claim 18 each communication interface is configured to transmit and receive communications among the plurality of position sensors.

20. The method of claim 10 further comprising associating an electronic compass with each position sensor.

21. The method of claim 10 further comprising obtaining, via an electronic compass included with the sensor, directional information associated with the asset or a user of the asset.

22. The method of claim 11 further providing, in association with each asset, a communication interface configured to communicate via a layered network.

23. The method of claim 22 each communication interface is configured to transmit and receive communications among the plurality of position sensors.

24. The method of claim 11 further comprising associating an electronic compass with each position sensor.

25. The method of claim 11 further comprising associating a gunshot location sensor with each sensor of a subset of the plurality of position sensors.

* * * * *